United States Patent [19]
Hagen

[11] Patent Number: 6,161,948
[45] Date of Patent: Dec. 19, 2000

[54] ADJUSTABLE MOUNT FOR SEALED LIGHT SYSTEMS

[75] Inventor: Douglas W. Hagen, Fresno, Calif.

[73] Assignee: B-K Lighting, Inc., Fresno, Calif.

[21] Appl. No.: 09/320,186

[22] Filed: May 26, 1999

Related U.S. Application Data

[60] Provisional application No. 60/086,927, May 27, 1998.
[51] Int. Cl.[7] .................................................. F21V 19/02
[52] U.S. Cl. ......................... 362/418; 362/267; 362/419; 362/427
[58] Field of Search .................................. 362/418, 419, 362/427, 267

[56] References Cited

U.S. PATENT DOCUMENTS 5,379,205  1/1995  Peng ........................................ 362/427
5,504,665  4/1996  Osteen et al. ............................ 362/287

*Primary Examiner*—Stephen Husar
*Attorney, Agent, or Firm*—Richard A. Ryan; Ryan & Engnath

[57] ABSTRACT

An adjustable mount for use with light fixtures that are sealed to prevent entry of moisture and contaminants. O-ring seals are utilized to connect and seal the components of the adjustable mount so that it is not a source of moisture or loss of vacuum. The adjustable mount is a knuckle-type mount that connects a light fixture with a junction box or other source of electrical power. The adjustable mount provides a full range of vertical and rotational angles without damaging the electrical wiring that is sealed inside the mount. Frictional connections in the mount allow the lighting angle to be set without the necessity of tightening the set screws which connect the components together.

22 Claims, 3 Drawing Sheets

ADJUSTABLE MOUNT FOR SEALED LIGHT SYSTEMS

CROSS-REFERENCE TO RELATED APPLICATIONS

This application claims the benefit of U.S. Provisional Application No. 60/086,927 filed May 27, 1998.

BACKGROUND OF THE INVENTION

1. Field of the Invention

The field of the present invention relates generally to devices for adjustably mounting a light for use in sealed lighting systems, such as those utilized for outdoor lighting. More specifically, this invention relates to mounting devices that allow adjustment of the direction of a light while maintaining the integrity of the sealed light system.

2. Background

It is well known that many people use lights, such as spotlights and other types of lights, in outdoor applications. These applications generally require a sealed lighting system to prevent moisture from entering the light housing, lamp or electrical wiring components of the light fixture. Often it is desirable to aim the light fixture or a series of light fixtures in a certain direction to obtain a desired effect. In order to set the direction of the light emanating from the light fixture and to be able to re-direct or adjust the direction of the light at a later date, the light mount assembly must include some type of adjustable connection that is able to maintain the integrity of the sealed system. However, in order to prevent damage to the wiring that connects the power source to the lamp, most light fixtures connections have limited adjustability. Those adjustable light mounts that have wide adjustability often have connections that do not adequately protect the wiring from damage or maintain a sealed light system.

The usual connection for obtaining adjustability for outdoor lighting is a knuckle joint located between the light housing and the electrical box or mounting canopy. Currently available adjustable mounts for outdoor lighting systems typically utilize a knuckle joint having opposing sides with serrated edges that are rotated to lock together to form the desired light angle. Several problems exist with these type of knuckle joints. The problems include limitation on the angles available (due to the fact that only when the serrated edges mate can the joint lock in place) and difficulty in setting the desired angle. The difficulty in setting the desired angle results from having to hold the joint together when setting the angle of the light, which either requires one person to go through several iterations to set the angle or the use of a second person to let the first person know when the lighting angle is that which is desired. Without a second person, the person setting the angle of the light must set the angle of the light, then stand back and view it and, if necessary, loosen the connection and repeat the process. Naturally, the need to utilize a second person or go through an iterative process can require significant time and effort just to set or reset an outdoor light. In many commercial uses of outdoor lights, where a number of lights may be used, this process can be very burdensome. What is needed, is an adjustable mount for outdoor lights that provides infinite adjustability and allows a single person to easily set the angle of the light while maintaining the integrity of the sealed light system.

SUMMARY OF THE INVENTION

The adjustable light mount of the present invention solves the problems identified above. That is to say, the present invention discloses a mounting device for sealed light systems that allows one person to infinitely adjust the angle of an outdoor light while providing a connection that maintains the integrity of the sealed light system. More specifically, the present invention provides a knuckle joint that provides frictional resistance to movement in order allow one person to adjustably set the lighting angle while providing a protected path through the knuckle joint for the wires that connect to the lamp.

The present invention comprises three principal components that can be made out of machined aluminum, such as 6061-T6, or other materials. These components are the support member, base member and stud member. The upper surface of the support member sealably connects to the light fixture housing. The side of the support member pivotally connects to the side of the base member. The bottom end of the stud member threadably connects to a junction box or the like which supplies power to electrically charge the lamp. The upper end of the stud member frictionally connects inside an opening at the bottom of the base member. Sealing members, such as O-rings, are utilized to seal the connection of the various members to each other and to the fixture housing.

A tapered post on the base side is sized and configured to fit within a tapered opening in the support side and provide some degree of frictional resistance to movement to make setting or adjusting the lighting angle easier than the prior art devices. Locking set screws are utilized to lock the rotational angle (the base member to stud member connection) and the vertical angle (the base member to support member connection) to obtain the desired lighting angle or effect.

Electrical wiring from the junction box passes through a stud opening, which traverses the entire stud member, then into the base opening and the second passageway located in the base member, and then through the first passageway in the support member to connect to the lamp. A pair of rotational stop members are utilized to prevent the adjustable mount from rotating more than 360 degrees, which would otherwise result in damage to the electrical wiring from the twisting of the wire inside the adjustable mount.

Accordingly, the primary objective of the present invention is to provide an adjustable mount for sealed light fixtures that provides an easy to use mechanism for adjusting and setting the desired lighting angle for light emanating from the light fixture.

It is also an important objective of the present invention to provide an adjustable mount that allows the electrical wiring necessary to power a lamp in a sealed light system to pass through the mount with damaging the wire or compromising the integrity of the sealed light system.

Another important objective of the present invention is to provide an adjustable light mount that provides infinite angle adjustability and which can be adjusted and set by a single person.

The above and other objectives of the present invention will be explained in greater detail by reference to the attached figures and the description of the preferred embodiment which follows. As set forth herein, the present invention resides in the novel features of form, construction, mode of operation and combination of parts presently described and understood by the claims.

BRIEF DESCRIPTION OF THE DRAWINGS

In the drawings which illustrate the best modes presently contemplated for carrying out the present invention.

DETAILED DESCRIPTION OF THE PREFERRED EMBODIMENTS

Figure 1:
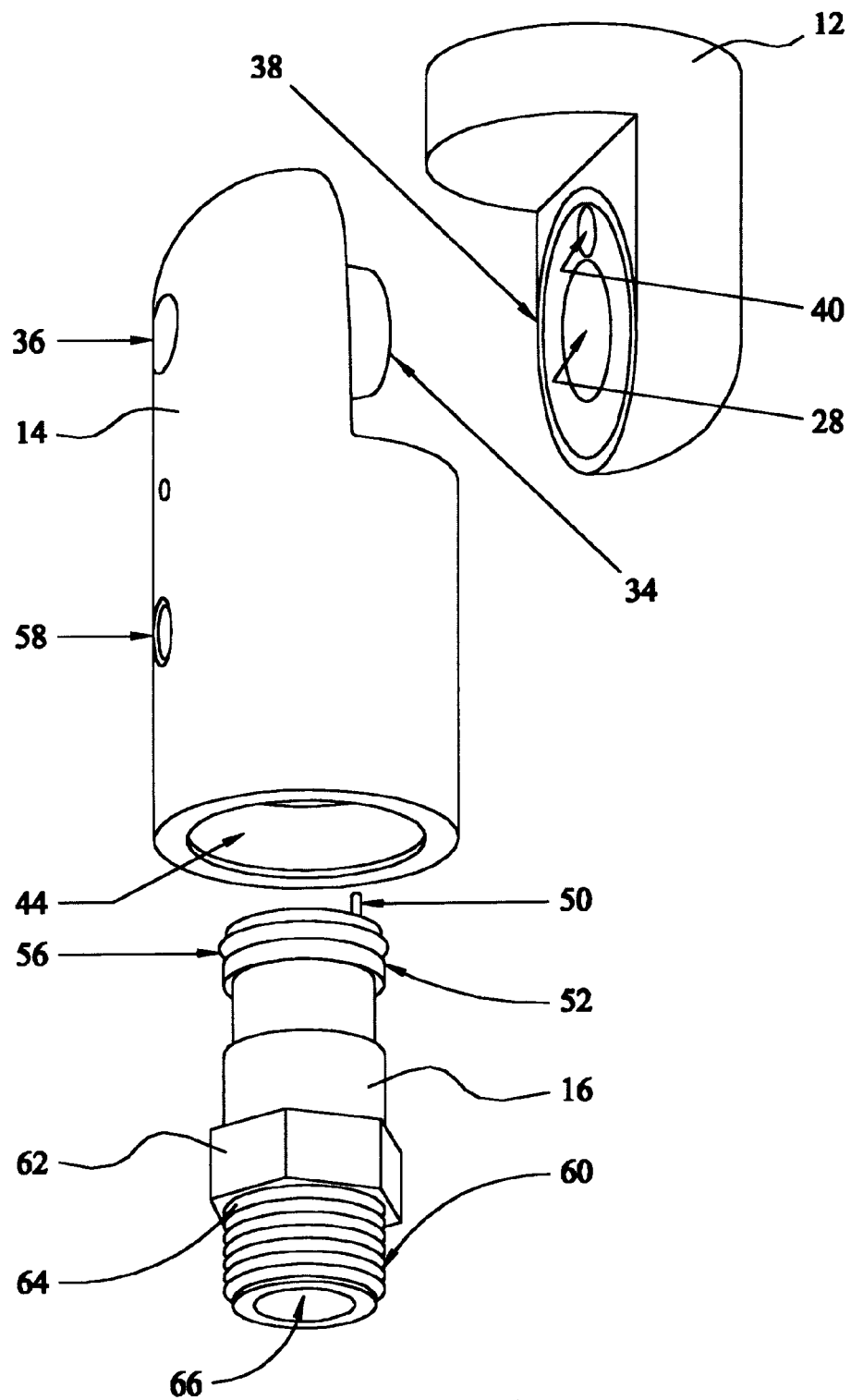
FIG. 1 is an exploded view of the adjustable mount of the present invention.
Figure 2:
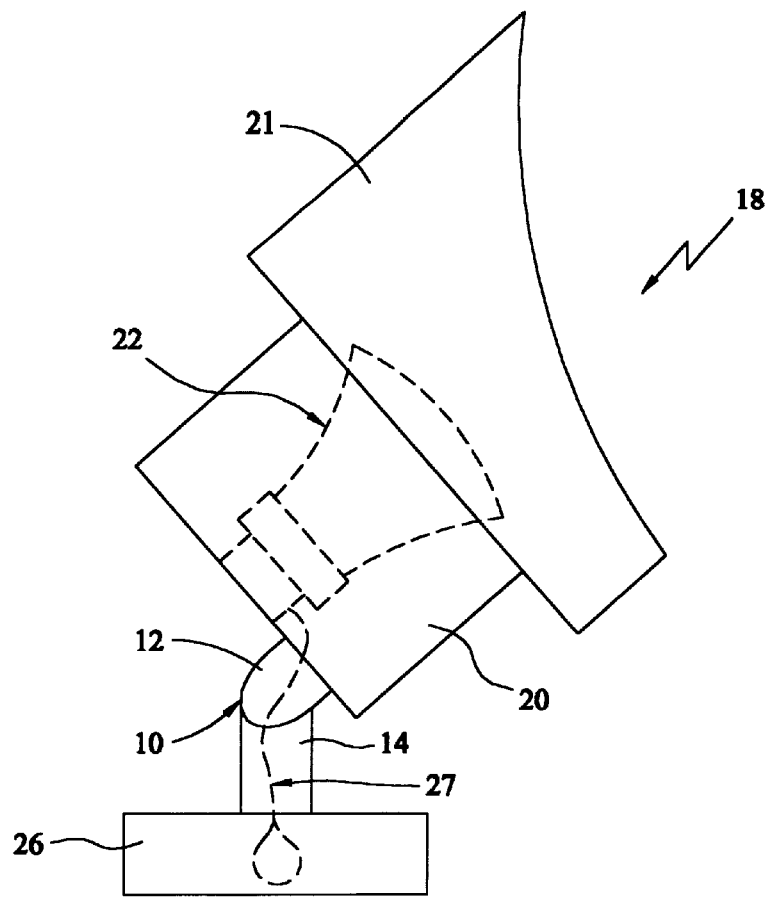
FIG. 2 is a side view of a typical light fixture utilizing the adjustable mount of the present invention.

With reference to the figures where like elements have been given like numerical designations to facilitate the reader's understanding of the present invention, and particularly with reference to the embodiment of the present invention illustrated in FIGS. 1 through 8, the preferred embodiment of the present invention is set forth below. The adjustable mount for sealed light fixtures of the present invention, designated generally as 10, primarily comprises a support member 12, base member 14 and stud member 16 connected together to form an adjustable mount 10 for a sealed light fixture 18. As is shown in FIG. 2, the typical sealed light fixture 18 has a housing 20 and cap 21 which enclose lamp 24. Housing 20 sealably connects to upper surface 24 of support member 12 utilizing a first sealing member, such as a high temperature silicone O-ring 25, as shown in FIG. 7. Stud member 16 threadably connects to a source of electrical power, such as an outlet box or mounting canopy 26 having electrical wires 27 that can connect to lamp 24.

Figure 3:
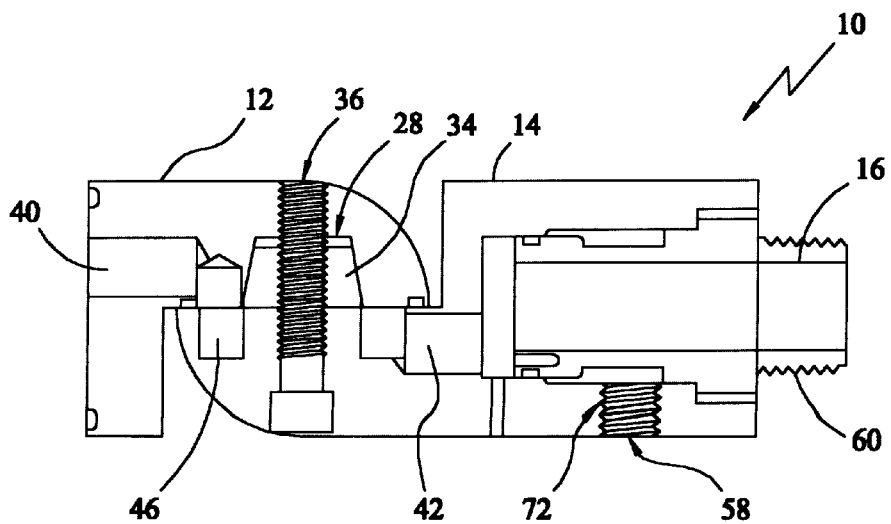
FIG. 3 is a cross-sectional side view of the primary embodiment of the adjustable mount of the present invention.

To facilitate adjustability of the adjustable mount 10, support member 12 pivotally connects to base member 14. However, for ease of use, adjustable mount 10 should include a mechanism to limit the amount of free pivotal movement for support member 12. As best shown in FIGS. 1 and 3, the preferred embodiment of the present invention includes support member 12 with a tapered opening 28 in support side 30, which abuts against base side 32 on base member 14. Extending outward from base side 32 is a tapered post 34 that is sized and configured to tightly fit inside tapered opening 28. Tapered opening 28 and tapered post 34 can be sized and configured so that when support member 12 is installed on base member 14, support member 12 can be manually pivoted relative to base member 14 yet will not freely pivot, even with the additional weight of light fixture 18 attached to support member 12. If properly sized and configured, tapered opening 28 and tapered post 34 will provide an internal compression fit that creates a positive lock when the user pivots support member 12 to aim the light emanating from light fixture 18, such that support member 12 (and therefore light fixture 18) will stay in place even when the user releases his or her grip on light fixture 18 or support member 12.

Figure 4:
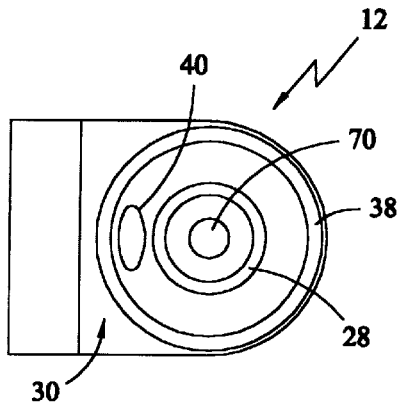
FIG. 4 is a plan view of the support side of the support member.

As best shown in FIG. 3, to lock the light in the desired vertical angle, a first locking mechanism, such as locking screw 22, can be used. To ensure the integrity of the sealed light system, a second sealing member 38 should be located between support member 12 and base member 14, as best shown in FIGS. 1 and 4. The preferred embodiment of the present invention utilizes a high temperature silicone O-ring as second sealing member 38. In addition to providing a water-tight seal, second sealing member 38 places a pressure loading on the threads of locking screw 36 such that vibrations will not cause locking screw 36 to loosen, as often happens with most other knuckle connectors. To allow the electrical wire to reach lamp 22 in housing 20, support member 12 has first passageway 40, shown in FIGS. 3 and 4, that passes through the support side 30 of support member 12 to upper surface 24 of support member 12 where housing 20 connects.

Figure 5:
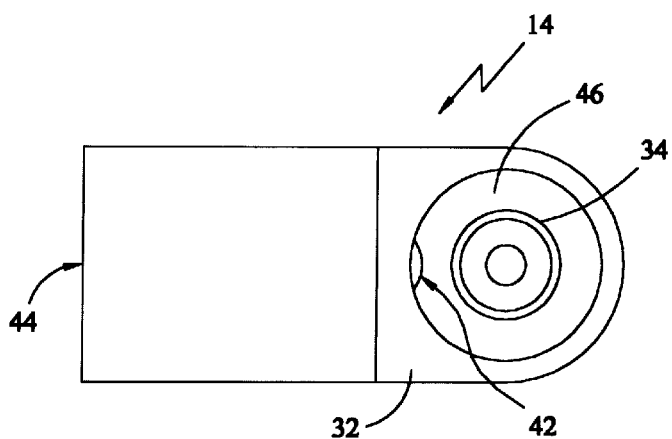
FIG. 5 is a perspective view of the base member of the present invention.
Figure 6:
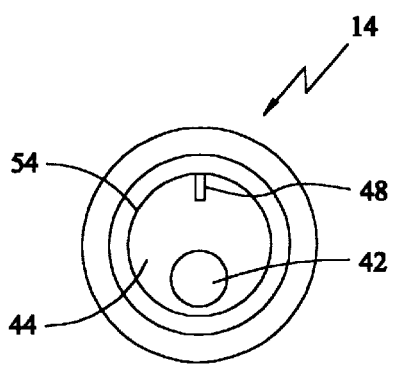
FIG. 6 is a end view showing the base opening of the base member.
Figure 7:
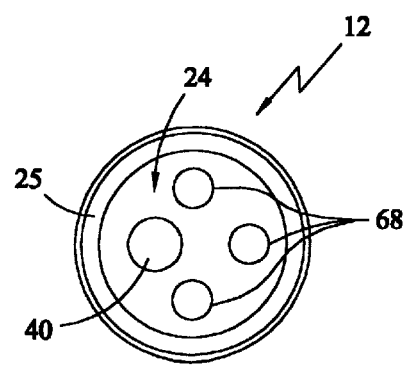
FIG. 7 is a plan view of the upper surface of the support member.

In the preferred embodiment, base member 14 has second passageway 42, shown in FIGS. 3, 4 and 6, that interconnects first passageway 40 with base opening 44 at the bottom of base member 14. Second passageway 42 goes through base member 14 to allow the electrical wires to reach housing 20 and lamp 22. Base side 32 has slot 46 to hold the electrical wires between first passageway 40 and second passageway 42 to prevent damage to the electrical wire during rotation of adjustable mount 10. As shown in FIG. 5, in the preferred embodiment slot 46 encircles tapered post 34.

A rotational limiting mechanism is necessary to prevent base member 14 from rotating more than 360 degrees to avoid twisting and, ultimately, breaking or otherwise damaging the electrical wiring. In the preferred embodiment, shown in FIGS. 1 and 6, the rotational limiting mechanism includes first rotational stop member 48 inside base opening 44 of base member 14 and second rotational stop member 50 at the upper end 52 of stud member 16. First rotational stop member 48 interacts with second rotational stop member 50 to limit the amount base member 14 can rotate relative to stud member 16.

Base opening 44 has an inner wall 54 which interacts with upper end 52 of stud member 16 when adjustable light mount 10 is assembled to limit the free rotation of base member 14. The outer diameter of upper end 52 should be sized and configured to frictionally interact with inner wall 54 so that it limits the free rotation of base member 14. To provide for further frictional limitation and seal the upper end 52 of stud member 16 can be provided with a third sealing member 56 to seal the base member 14 to stud member 16 connection. As with the other sealing members, third sealing member 56 can be a high temperature silicone O-ring that encircles upper end 52 of stud member 16 to provide a frictional, sealed connection with inner wall 54 in base member 14. Upper end 52 of stud member 16 and third sealing member 56 should be sized and configured such that the frictional resistance created within base member 14 is sufficient to prevent unwanted rotation of base member 14 (and therefore light fixture 18) to allow the user to set the rotational angle he or she desires for the light emanating from lamp 22. To prevent unwanted movement of third sealing member 56, upper end 52 of stud member 16 should be configured to include an O-ring slot (not shown) or other mechanism for holding third sealing member 56 in place. A second locking mechanism is needed to lock the position of base member 14 relative to stud member 16 once the desired light position is obtained. In the preferred embodiment, second locking mechanism is a set screw 58 going through base member 14, as shown in FIG. 3, and operatively connecting to stud member 16.

Lower end 60 of stud member 16 should be suitable for connecting the light mount 10 to a junction box or mounting canopy, shown as 26 on FIG. 2. The typical connection will be a threaded lower end 60, shown in FIG. 1, that can be threadably connected to the junction box or mounting canopy 26 utilizing integral nut 62, or a similar tightening mechanism. Fourth sealing member 64, such as an O-ring, ensures the integrity of the sealed light system by sealing the lower end 60 of stud member 16 to junction box 26 connection. Stud member 16 has a stud opening 66 through its center to allow the electrical wires to pass through stud member 16 to base member 14, support member 12 and lamp 22. As shown in FIG. 7, upper surface 24 of support member 12 can have one or more first screw receiving sockets 68 to connect support member 12 to housing 20. Tapered opening 28 can have a second screw receiving socket 70, shown in FIG. 4, for receiving locking screw 36 to connect base member 14 to support member 12. Base member 14 can have a set screw opening 72, shown in FIG. 3, for receiving set screw 58 that is utilized to fixedly connect base member 14 to stud member 16.

In use, adjustable light mount 10 is placed between housing 20 and junction box or support canopy 26 such that housing 20 connects to support member 12 and stud member 16 connects to junction box 26. The electrical wires from junction box 26 passes through stud opening 64 in stud member 16 into base opening 44, second passageway 42 and then slot 46 in base member 14 and then through first passageway 40 in support member 12 to lamp 22 in housing 20 of light fixture 18. Due to the frictional resistance between support member 12 and base member 14 and between base member 14 and stud member 16, the user can fully rotate the light fixture to obtain the desired angle for the light without having to use the iterative steps described in the prior art or a second person. In addition, the lack of serrated edges or gears allows the user to have infinite adjustability for the lighting angle.

Third sealing member 56 allows the user to have full rotational capability for light mount 10 while maintaining the integrity of light mount 10 to junction box 26 connection. Once the desired rotational angle is obtained for the light mount 10, the user can lock base member 14 to stud member 16 with set screw 58. After setting the base member 14 to stud member 16 rotational angle, the user then can set the vertical angle of the light mount 10 by adjusting the base member 14 to support member 12 connection. Once the desired vertical angle is obtained, the user can lock it into place with locking screw 36. Naturally, the order of setting the angles can be reversed. This simple aim and lock capability for use with a sealed light system provides significant benefits over the prior art.

While there are shown and described herein certain specific alternative forms of the invention, it will be readily apparent to those skilled in the art that the invention is not so limited, but is susceptible to various modifications and rearrangements in design and materials without departing from the spirit and scope of the invention. In particular, it should be noted that the present invention is subject to modification with regard to the dimensional relationships set forth herein and modifications in assembly, materials, size, shape, and use.

What is claimed is:

1. An adjustable mount for a light fixture, comprising:
   a support member connected to the light fixture, said support member having a first passageway therethrough to allow passage of one or more electrical wires to said light fixture;
   a base member having a second passageway therethrough and a base opening at one end of said base member, said base member pivotally connected at an end opposite said base opening to said support member, said second passageway connected to said first passageway in said support member to allow passage of said electrical wires;
   first locking means for locking said support member to said base member;
   a stud member having an upper end, a lower end and a stud opening through said stud member, said upper end of said stud member in said base opening and rotationally interacting therewith, said lower end of said stud member configured to connect to a source of electrical power, said stud opening connected to said second passageway in said base member to allow passage of said electrical wires from said source of electrical power to said base member; and
   second locking means for locking said base member to said stud member.

2. The adjustable mount according to claim 1, further comprising first resistance means for limiting free pivotal movement of said base member relative to said support member.

3. The adjustable mount according to claim 2, wherein said first resistance means comprises a tapered opening in said support member and a tapered post in said base member, said tapered opening sized and configured to receive said tapered post and allow frictional pivoting of said tapered post therein.

4. The adjustable mount according to claim 1 further comprising second resistance means for limiting free rotational movement of said base member relative to said stud member.

5. The adjustable mount according to claim 4, wherein said second resistance means comprises an inner wall in said base opening, said inner wall sized and configured to frictionally receive said upper end of said stud member and allow frictional rotation of said base member relative to said stud member.

6. The adjustable mount according to claim 1 further comprising a slot in said base member disposed between said first passageway in said support member and said second passageway in said base member when said support member and said base member are operatively connected, said slot sized and configured to pass said electrical wires from said second passageway to said first passageway.

7. The adjustable mount according to claim 1 further comprising first sealing means on said support member for sealing the connection between said support member and the light fixture, second sealing means disposed between said support member and said base member for sealing the connection of said base member to said support member, third sealing means on said upper end of said stud member for sealing the connection between said base member and said stud member, and fourth sealing means on said lower end of said stud member for sealing the connection between said stud member and said source of electrical power.

8. The adjustable mount according to claim 7, wherein said first sealing means, said second sealing means, said third sealing means and said fourth sealing means are O-rings.

9. The adjustable mount according to claim 1 further comprising rotational limiting means interconnecting said base member and said stud member for limiting rotation of said base member relative to said stud member to prevent damage to said electrical wires.

10. The adjustable mount according to claim 9, wherein said rotational limiting means comprises a first rotational stop member in said base opening of said base member and a second rotational stop member at said upper end of said stud member, said rotational limiting means limiting rotation of said base member to less than 360 degrees relative to said stud member.

11. An adjustable mount for a light fixture, comprising:
    a support member connected to the light fixture, said support member having a first passageway therethrough to allow passage of one or more electrical wires to said light fixture;

a base member having a second passageway therethrough and a base opening at one end of said base member, said base member pivotally connected at an end opposite said base opening to said support member, said second passageway connected to said first passageway in said support member to allow passage of said electrical wires;

first resistance means for limiting free pivotal movement of said base member relative to said support member;

first locking means for locking said support member to said base member;

a stud member having an upper end, a lower end and a stud opening through said stud member, said upper end of said stud member in said base opening and rotationally interacting therewith, said lower end of said stud member configured to connect to a source of electrical power, said stud opening connected to said second passageway in said base member to allow passage of said electrical wires from said source of electrical power to said base member;

second resistance means for limiting free rotational movement of said base member relative to said stud member; and second locking means for locking said base member to said stud member.

12. The adjustable mount according to claim 11, wherein said first resistance means comprises a tapered opening in said support member and a tapered post in said base member, said tapered opening sized and configured to receive said tapered post and allow frictional pivoting of said tapered post therein.

13. The adjustable mount according to claim 11, wherein said second resistance means comprises an inner wall in said base opening, said inner wall sized and configured to frictionally receive said upper end of said stud member and allow frictional rotation of said base member relative to said stud member.

14. The adjustable mount according to claim 11 further comprising a slot in said base member disposed between said first passageway in said support member and said second passageway in said base member when said support member and said base member are operatively connected, said slot sized and configured to pass said electrical wires from said second passageway to said first passageway.

15. The adjustable mount according to claim 11 further comprising first sealing means on said support member for sealing the connection between said support member and the light fixture, second sealing means disposed between said support member and said base member for sealing the connection of said base member to said support member, third sealing means on said upper end of said stud member for sealing the connection between said base member and said stud member, and fourth sealing means on said lower end of said stud member for sealing the connection between said stud member and said source of electrical power.

16. The adjustable mount according to claim 11 further comprising rotational limiting means interconnecting said base member and said stud member for limiting rotation of said base member relative to said stud member to prevent damage to said electrical wires.

17. An adjustable mount for a light fixture, comprising:

a support member connected to the light fixture, said support member having a first passageway therethrough to allow passage of one or more electrical wires to said light fixture;

a base member having a second passageway therethrough and a base opening at one end of said base member, said base member pivotally connected at an end opposite said base opening to said support member, said second passageway connected to said first passageway in said support member to allow passage of said electrical wires;

first resistance means for limiting free pivotal movement of said base member relative to said support member;

first locking means for locking said support member to said base member;

a stud member having an upper end, a lower end and a stud opening through said stud member, said upper end of said stud member in said base opening and rotationally interacting therewith, said lower end of said stud member configured to connect to a source of electrical power, said stud opening connected to said second passageway in said base member to allow passage of said electrical wires from said source of electrical power to said base member;

a slot in said base member disposed between said first passageway in said support member and said second passageway in said base member when said support member and said base member are operatively connected, said slot sized and configured to pass said electrical wires from said second passageway to said first passageway;

second resistance means for limiting free rotational movement of said base member relative to said stud member;

rotational limiting means interconnecting said base member and said stud member for limiting rotation of said base member relative to said stud member to prevent damage to said electrical wires; and second locking means for locking said base member to said stud member.

18. The adjustable mount according to claim 17, wherein said first resistance means comprises a tapered opening in said support member and a tapered post in said base member, said tapered opening sized and configured to receive said tapered post and allow frictional pivoting of said tapered post therein.

19. The adjustable mount according to claim 18, wherein said slot encircles said tapered post.

20. The adjustable mount according to claim 17, wherein said second resistance means comprises an inner wall in said base opening, said inner wall sized and configured to frictionally receive said upper end of said stud member and allow frictional rotation of said base member relative to said stud member.

21. The adjustable mount according to claim 20, wherein said first resistance means comprises a tapered opening in said support member and a tapered post in said base member, said tapered opening sized and configured to receive said tapered post and allow frictional pivoting of said tapered post therein.

22. The adjustable mount according to, claim 17 further comprising first sealing means on said support member for sealing the connection between said support member and the light fixture, second sealing means disposed between said support member and said base member for sealing the connection of said base member to said support member, third sealing means on said upper end of said stud member for sealing the connection between said base member and said stud member, and fourth sealing means on said lower end of said stud member for sealing the connection between said stud member and said source of electrical power.

* * * * *